United States Patent
Nishikawa (10) Patent No.: US 8,345,802 B2
(45) Date of Patent: Jan. 1, 2013

(54) RECEIVER FOR DIGITAL MODULATED SIGNAL AND RECEIVING METHOD FOR THE SAME

(75) Inventor: Masaki Nishikawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 918 days.

(21) Appl. No.: 11/472,351

(22) Filed: Jun. 22, 2006

(65) Prior Publication Data

US 2006/0291375 A1    Dec. 28, 2006

(30) Foreign Application Priority Data

Jun. 23, 2005   (JP) .................................. 2005-183007

(51) Int. Cl.
*H04L 27/00* (2006.01)
(52) U.S. Cl. ........................................................ 375/324
(58) Field of Classification Search .................. 375/322, 375/324, 316, 348, 259, 260, 295; 370/210, 370/348, 208, 350
See application file for complete search history.

(56) References Cited

U.S. PATENT DOCUMENTS

| | | | | |
|---|---|---|---|---|
| 2002/0094014 A1* | 7/2002 | Kim et al. | ...................... | 375/130 |
| 2003/0109277 A1* | 6/2003 | Fulghum et al. | .............. | 455/552 |
| 2004/0062317 A1 | 4/2004 | Uesugi et al. | | |
| 2004/0091057 A1 | 5/2004 | Yoshida | | |
| 2004/0171352 A1* | 9/2004 | Maeda et al. | .............. | 455/67.13 |
| 2005/0002474 A1* | 1/2005 | Limberg | ........................ | 375/321 |
| 2005/0175121 A1* | 8/2005 | Doi | ................................ | 375/316 |
| 2005/0213689 A1* | 9/2005 | Matsuda et al. | .............. | 375/324 |
| 2006/0029143 A1* | 2/2006 | Yoshida | ........................ | 375/260 |

FOREIGN PATENT DOCUMENTS

| | | |
|---|---|---|
| CN | 1488209 A | 4/2004 |
| JP | 11-298434 | 10/1999 |
| JP | 2000-286817 | 10/2000 |
| JP | 2001-292120 | 10/2001 |
| JP | 2003-51802 | 2/2003 |
| JP | 2004-208254 | 7/2004 |
| WO | WO 03/21833 | 3/2003 |

OTHER PUBLICATIONS

Masaki Nishikawa, et al., "Study of Interference Suppression for Long-Delay Multipaths in Digital Terrestrial Television Broadcasting Reception", ITE Technical Report vol. 29, No. 36, BCT2005-71 (Jun. 2005), pp. 9-12.

Koichiro Imamura, et al., "Channel Equalizer for Long-Delay Multipath beyond the Guard Interval in DTTB", ITE Technical Report vol. 26, No. 53, BCS2002-30, ROFT2002-72 (Jul. 2002), pp. 9-12.

Japanese Office Action issued Oct. 27, 2010, in Patent Application No. 2005-183007 (with English-language translation).

(Continued)

*Primary Examiner* — David C. Payne
*Assistant Examiner* — Syed Haider
(74) *Attorney, Agent, or Firm* — Oblon, Spivak, McClelland, Maier & Neustadt, L.L.P.

(57) ABSTRACT

A receiver for a digital modulated signal which receives a multi-carrier modulated signal and demodulates a receiving signal by converting it from a time region into a frequency region by Fourier transform is provided. The receiver comprises a Fourier transformer which performs Fourier transform of the receiving signal and an interference removing circuit which reduces an inter-symbol interference or an inter-carrier interference of the receiving signal. The removing circuit is disposed in a front stage of the Fourier transformer.

17 Claims, 8 Drawing Sheets

OTHER PUBLICATIONS

Japanese Office Action issued Jul. 8, 2011, in Patent Application No. 2005-183007 (with English-language translation).

Zdeněk Smékal, et al., "Time Domain Equalization for ADSL Technology and its Optimization", $10^{TH}$ International Conference on Telecommunications, Mar. 1, 2003, pp. 1171-1176.

* cited by examiner

RECEIVER FOR DIGITAL MODULATED SIGNAL AND RECEIVING METHOD FOR THE SAME

CROSS-REFERENCE TO RELATED APPLICATIONS

This application is based upon and claims the benefit of priority from prior Japanese Patent Application No. 2005-183007, filed Jun. 23, 2005, the entire contents of which are incorporated herein by reference.

BACKGROUND OF THE INVENTION

1. Field of the Invention

The present invention relates to a receiver for a digital modulated signal and a receiving method for the same, which receives a multi-carrier modulated signal extremely reduced in an inter-symbol interference (hereinafter referred to as ISI) or in an inter-carrier interference (hereinafter referred to as ICI).

2. Description of the Related Art

In recent years, a digital modulation method has been widely developed in a transmission of a sound signal and a video signal. In particular, a multi-carrier modulation method has attracted attention in the fact that it has a high resistance to a multi-path interference because it can expand its symbol period length. And then, an orthogonal frequency division multiplexing (OFDM) method and a modulation method derived therefrom have been actively studied.

Examples of use of OFDM include a terrestrial digital broadcasting. The OFDM is employed for the terrestrial digital broadcasting in Europe and in Japan, because of highly rating the features such that the OFDM has a high resistance to a multi-path interference and high frequency use efficiency. The OFDM is a method for modulating a plurality of carries crossing at right angles with one another by digital data to be transmitted and transmits the digital data by multiplexing those modulated waves. If the number of the carriers to be used is increased to an extent from several-hundred to several-thousand, a width of one symbol becomes extremely wide, so that the OFDM has a feature that it is hardly affected by the muti-path interference. Further, forming a transmission symbol by adding a replica of a signal at a rear section of an effective symbol in front thereof as a guard interval signal, the OFDM becomes possible to disregard the influence of the interference against a multi-path of a delay time not longer than a guard interval length. However, the existence of a multi-path interference of a delay time longer than the guard interval length causes the ISI and the ICI to deteriorate reception performance. The multi-path interference having such a long delay time presents a big problem in implementing a single frequency network (SFN).

As for a method to solve the problem, a method for canceling the multi-path interference by estimating a transmission path response by use of an adaptive equalizing filter to control a filter coefficient of the adaptive equalizing filter so as to cancel multi-path components has been designed (for instance, Jpn. Pat. Appln. KOKAI Publications No. 11-298434 and No. 2001-292120). However, if there is an estimated error in estimating the transmission path response resulting form temporal variations in noise and the transmission path response, a problem is produced such that each aforementioned conventional method cannot remove the interference components and also newly adds multi-path interference having a delay time that is integer multiple of a delay time of a delayed wave to the interference components to extremely deteriorate the reception performance.

The present invention provides a receiver for a digital modulated signal and a method for the same, which can reduce the ISI or the ICI and improve the reception performance.

BRIEF SUMMARY OF THE INVENTION

A receiver for a digital modulated signal, which receives a multi-carrier modulated signal and converts a receiving signal from a time region into a frequency region by Fourier transform to demodulate it according to a first aspect of the present invention comprises: a Fourier transformer performing Fourier transform of the receiving signal; and an interference removing circuit disposed at a font stage from the Fourier transformer to reduce an ISI and an ICI of the receiving signal.

A receiver for a digital modulated signal, which receives a multi-carrier modulated signal and converts a receiving signal from a time region into a frequency region by Fourier transform to demodulate it according to a second aspect of the present invention comprises: a Fourier transformer performing Fourier transform to the receiving signal; and an interference removing circuit disposed at a front stage from the Fourier transformer to reduce an ISI and an ICI of the receiving signal, wherein the removing circuit combines the interference removing components generated from the receiving signal on the basis of a transmission path response only during an appropriate period including a period being interfered from the ISI or the ICI at every period performing Fourier transform and outputs the receiving signal as it is during a period other than the appropriated period.

A receiving method for a digital modulated signal, which receives a multi-carrier modulated signal and converts a receiving signal from a time region into a frequency region by Fourier transform to demodulate it according to a third aspect of the present invention comprises: reducing an ISI or an ICI of the receiving signal; and performing Fourier transform to the receiving signal in which the interference is reduced.

DETAILED DESCRIPTION OF THE INVENTION

The present invention in relation to a receiver for a digital modulated signal, which receives a multi-carrier modulated signal and converts a receiving signal from a time region into a frequency region by Fourier transform to demodulate, is characterized in that the receiver comprises a Fourier transformer performing Fourier transform to the receiving signal, and an interference removing circuit disposed at a front stage from the Fourier transformer to reduce an ISI and an ICI of the receiving signal, wherein the removing circuit combines the interference removing components generated from the receiving signal on the basis of a transmission path response only during an appropriate period including a period being interfered from ISIs or ICIs at every period performing Fourier transform and outputs the receiving signal as it is during a period other than the appropriate period.

Hereinafter, embodiments of the present invention will be described with reference to embodiments.

First Embodiment

Referring to FIG. 1 to FIG. 4, FIG. 9 and FIG. 10, a first embodiment will be described.

A first embodiment relates to an Integrated services digital broadcasting for terrestrial (ISDB-T) (other embodiments go the same). In the following explanations, it is presumed that a scattered pilot (hereinafter referred to as SP) carrier that is an amplitude/phase reference is used as a reference signal in estimating a transmission path response.

Figure 9:
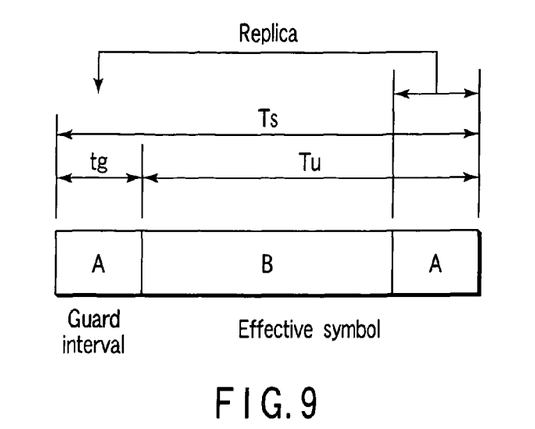
FIG. 9 is an exemplary view explaining one transmission symbol of OFDM to explain the first embodiment.

The ISI and the ICI will be explained by referring to FIG. 9 and FIG. 10. FIG. 9 shows one transmission symbol of an OFDM. Because a signal component of a guard interval is the same as that of a rear section of an effective symbol, signal components belonging to the guard interval and to the rear section of the effective symbol are indicated, as shown in FIG. 9, as "A" and signal components belonging to other sections are indicated as "B" for simplifying the explanation. To express clearly the fact that the polarities of the signal components indicated by a code A and a code B are inverted with each other, it is defined that the signal components are indicated as "-A" and "-B", respectively. Further, it is defined that the widths of one transmission symbol, of the effective symbol and of the guard interval are indicated as, Ts, Tu and Tg, respectively.

Figure 10:
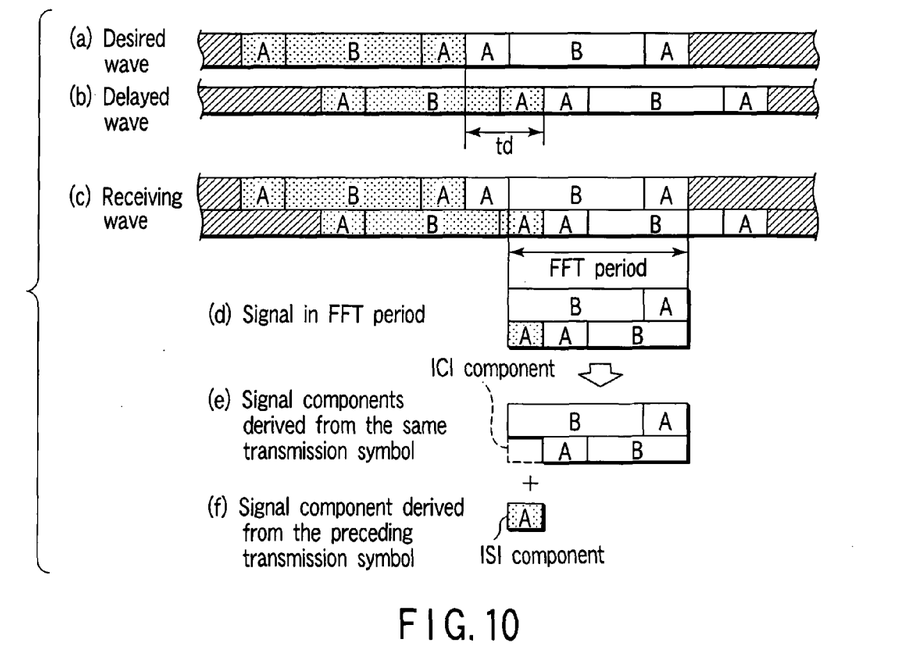
FIG. 10 is a view explaining an example of an ISI and an ICI to explain the first embodiment.

FIG. 10 is an exemplary view explaining an example of the ISI and the ICI. FIG. 10 shows two successive transmission symbols in close-up. The addition of a delayed wave (b) of a delay time td (td>Tg) to a desired wave (a) makes the receiver receive a receiving wave (c). A conventional receiver cuts out a fast Fourier transform (FFT) period from the receiving wave (c) to perform discrete Fourier transform. The cut out FFT period signal (d) seems a signal in which a signal component (e) derived from the same transmission symbol and a signal component (f) derived from the preceding transmission symbol are combined. As being cleared from FIG. 10, a continuity of a delay wave component is missing form a section indicated by a dot-line in the signal component (e) derived from the same transmission symbol. The missing causes the ICI and further the signal component (f) derived from the preceding transmission causes the ISI. The period missing the continuity of the delayed wave component therefrom and the period in which the signal component derived from the preceding transmission exists is the same period during the FFT period. In the present invention, the period in which the signal component of the not desired symbol exists is called "a period subjected to the ISI."

Figure 1:
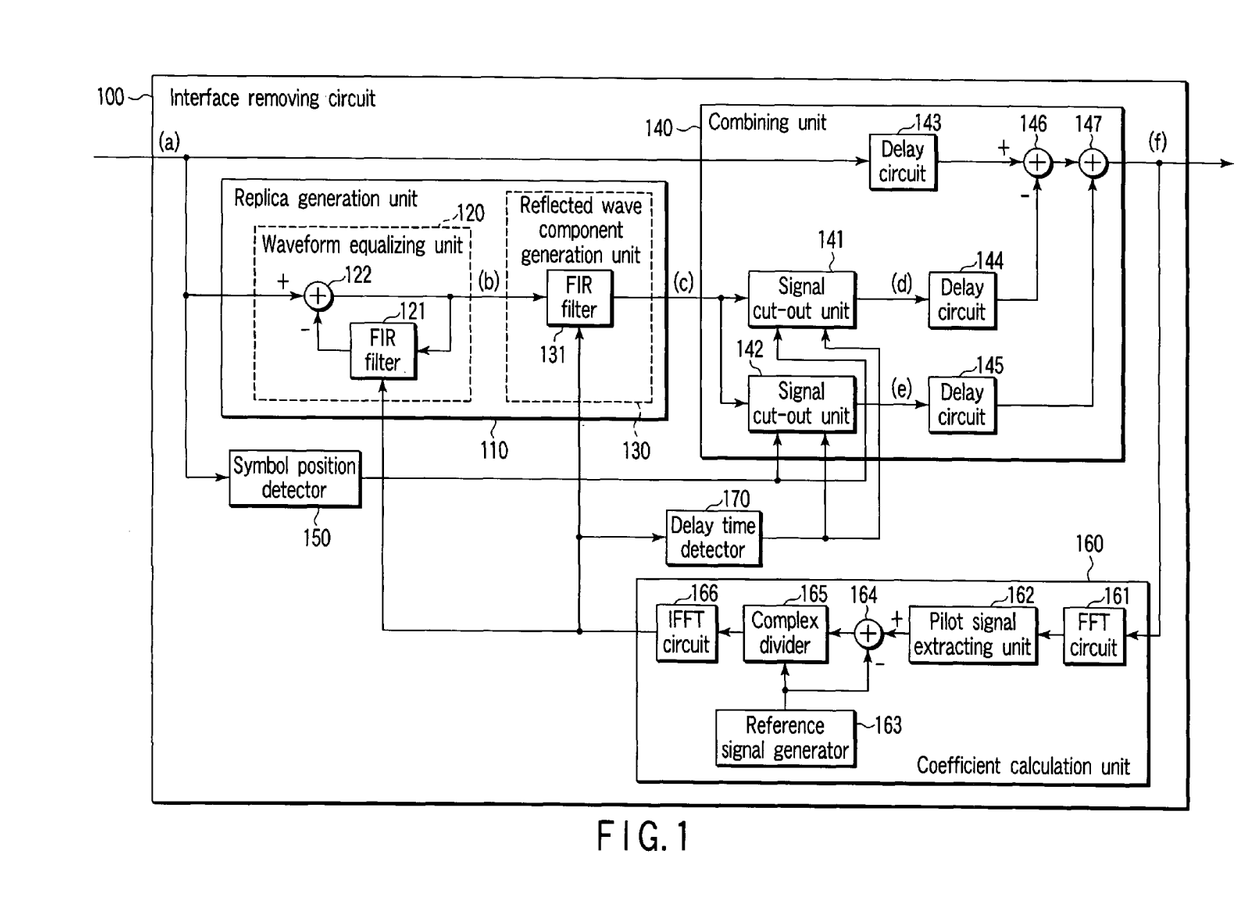
FIG. 1 is an exemplary block diagram showing an example of a configuration of an interference removing circuit of a first embodiment that is an embodiment of the present invention.
Figure 2:
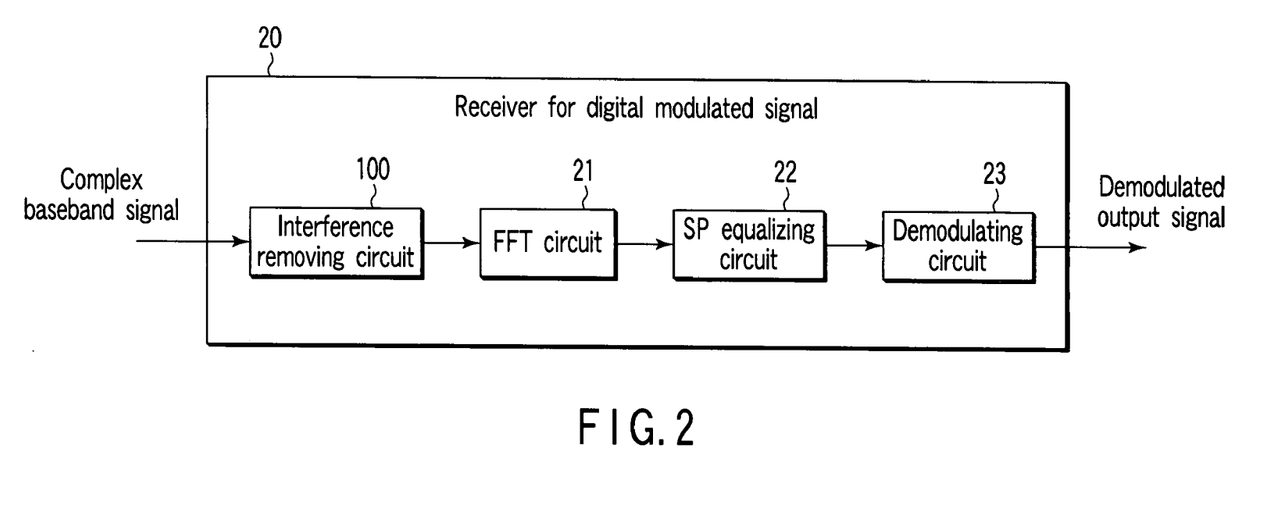
FIG. 2 is an exemplary block diagram showing an example of a configuration of a receiver for receiving a digital modulated signal with each of interference removing circuits in a first, a second and a third embodiments that are embodiments of the present invention applied thereto.

FIG. 2 is an exemplary block diagram showing a configuration of a receiver for digital modulated signal 20 to which interference removing circuits that will be described in the first embodiment, in a second embodiment and in a third embodiment are applied. FIG. 1 is an exemplary block diagram showing a configuration of an interference removing circuit 100 in the first embodiment. To be easily understood, in the first embodiment (the following embodiments also go the same), unless a previous notice is made, the case where a signal in which a delayed wave of one wave having a delay time exceeding a guard interval is added to a desired wave has been receiving will be explained as an example. FIG. 1 shows an example suitable for removing an interference caused by such delayed wave.

The receiver 20 will be firstly described by referring to FIG. 2. A digital complex baseband signal in which a receiving signal is A/D-converted and orthogonally demodulated is input to the receiver 20. The removing circuit 100 receives the input digital complex baseband signal and supplies a signal from which the ISI and ICI are removed to an FFT circuit 21. The FFT circuit 21 cuts out an FFT period from the signal input in accordance with a symbol synchronous signal generated from a symbol synchronous signal generation unit (not shown) to perform discrete Fourier transform and supplies an obtained baseband signal on a frequency axis to an SP equalizing circuit 22. The equalizing circuit 22 waveform-equalizes the signal input having the SP signal included in the input signal as a reference to supply it to a demodulating circuit 23. The demodulating circuit 23 demodulates the input signal and reproduces information in the signal obtained in receiving processing to output it as a demodulated output signal.

Next to this, the interference removing circuit 100 in the first embodiment will be explained by referring to FIG. 1. The removing circuit 100 comprises a symbol position detector 150 detecting breaks in the transmission symbol from the input signal, a replica generation unit 110 generating a replica signal of a reflected wave from the input signal, a combining unit 140 combining the replica of the reflected wave and the input signal, a coefficient calculation unit 160 estimating the transmission path response from the output of the combining unit 140 to control the property of the replica generation unit 110 and a delay time detector 170 detecting the delay time of the delayed wave from the output of the calculation unit 160.

The replica generation unit 110 consists of a waveform equalizing unit 120 and a reflected wave component generation unit 130. The waveform equalizing unit 120 is composed of an FIR filter 121 which is connected to an output from a subtracter 122 and of which the coefficient is varied by a coefficient calculation unit 160 and the subtracter 122 subtracting the output of the FIR filter 121 from the input signal. The component generation unit 130 consists of an FIR filter 131 of which the coefficient is varied by the coefficient calculation unit 160. The FIR filter can be composed of, for example, a transversal filter.

The combining unit 140 includes a symbol position detector 150, a signal cut-out units 141 and 142 each cutting out a part of signals supplied from the replica generation unit 110 on the basis of a detection result from a delay time detector 170, delay circuits 144 and 145 delaying the respective outputs from the cut-out units 141 and 142, a delay circuit 143 delaying the input signal by a prescribed time, and a subtracter 146 and an adder 147 outputting by subtracting and adding the outputs from the delay circuits 144 and 145 from and to the output of the delay circuit 143, respectively.

The coefficient calculation unit 160 consists of an FFT circuit 161 performing a discrete Fourier transform of the output from the combining 140, a pilot signal extracting unit 162 extracting a pilot signal from the output of the FFT circuit 161, a reference signal generator 163 generating a reference signal equivalent to a pilot signal with not transmission path distortion included therein in synchronization with the extracted pilot signal, a subtracter 164 subtracting the reference signal from the extracted pilot signal, a complex divider 165 diving the output from the subtracter 164 by the reference signal, and an IFFT circuit 166 performing inverse discrete Fourier transform of the subtraction result to output its transform result.

Next, operations of the coefficient calculation unit 160 and the delay time detector 170 will be explained while explaining the way of thinking for estimation of the transmission path response.

"$R(\omega)$" denotes a frequency characteristic of the known pilot signal inserted by a digital broadcasting transmitting device (not shown), "$S(\omega)$" denotes a frequency characteristic of the pilot signal included in the receiving signal, and "$H(\omega)$" denotes a frequency response of a delayed wave in a transmission path, then, the pilot signal included in the receiving signal is expressed by the following equation (1) and input to the interference removing circuit 100.

$$S(\omega)=[1+H(\omega)]R(\omega) \quad (1)$$

The removing circuit 100 operating so as to leave the frequency characteristic of the input signal as it is and remove only the interference component, the coefficient calculation unit 160 receives the frequency characteristic "$S(\omega)$" as it is and the extracting unit 162 can output the "$S(\omega)$".

Here, the reference signal generator 163 supplies the frequency characteristic "$R(\omega)$" of the known pilot signal then the complex divider 165 outputs "$D(\omega)$" represented by the following equation (2).

$$D(\omega) = [S(\omega) - R(\omega)] \div R(\omega) \quad (2)$$
$$= S(\omega) \div R(\omega) - 1$$

Here, if equation (1) is substituted to the equation (2), the following equation (3) is obtained.

$$D(\omega)=H(\omega) \quad (3)$$

That is to say, the output "$D(\omega)$" from the complex divider 165 becomes equal to the frequency response "$H(\omega)$" of the delayed wave and the inverse discrete Fourier transform of the output "$D(\omega)$" performed by the IFFT circuit 166 results in an indication of an impulse response of the delayed wave.

Where "$X(\omega)$" denotes the frequency characteristic of the transmission signal from the digital broadcasting transmitting device, and "$Y(\omega)$" denotes the frequency characteristic of the receiving signal, then, the "$Y(\omega)$" is represented as follows:

$$Y(\omega)=[1+H(\omega)]X(\omega) \quad (4)$$

And this output "$Y(\omega)$" is supplied to the waveform equalizing unit 120 in FIG. 1. Its output is denoted as "$Z(\omega)$".

"$F(\omega)$" denotes the frequency characteristics of the FIR filter 121, then, the input/output characteristic of the waveform equalizing unit 120 expressed as following equation.

$$Z(\omega)=Y(\omega)-F(\omega)Z(\omega) \quad (5)$$

Then, the following equation (6) is represented by modifying the equation (5).

$$Z(\omega)=Y(\omega)\div[1+F(\omega)] \quad (6)$$

Substituting formula (4) to the equation (6), the following formula (7) is obtained.

$$Z(\omega)=\{[1+H(\omega)]\div[1+F(\omega)]\}X(\omega) \quad (7)$$

Then, the relationship between the transmitting signal "$X(\omega)$" and the output "$Z(\omega)$" from the waveform equalizing unit 120 is expressed.

Here, when the result of applying, by the IFFT circuit 166, inverse discrete Fourier transform to the output "$D(\omega)$" from the complex divider 165 is given as the coefficient of the FIR filter 121, namely is set as $F(\omega)=D(\omega)$, formula (7) is modified as follows:

$$Z(\omega)=\{[1+H(\omega)]\div[1+D(\omega)]\}X(\omega 0) \quad (8)$$

Furthermore, substituting formula (3) to formula (8), the following formula is obtained.

$$Z(\omega)=X(\omega) \quad (8)$$

In other words, it becomes possible for the transmitting signal "$X(\omega)$" to be obtained at the output of the waveform equalizing unit 120 by the above-mentioned operations.

In a state where the interference removing circuit 100 does not remove an interference or does not remove it sufficiently, the output from the pilot signal extracting unit 162 possibly includes an error. In this case, the coefficient of the FIR filter 121 is updated by using the following equation (9).

$$C(k+1)=(1-\alpha)\times c(k)+\alpha\times v(k) \quad (9)$$

Where $v(k)$ is the output of the coefficient calculation unit 160 of the k-th output (k is positive integer), $c(k)$ is the coefficient of the FIR filter 121 and $\alpha$ is a constant not larger than 1.

With repetition of the aforementioned operations, the errors are reduced and the interferences are removed. Setting $\alpha$ as a small value makes the interference removing hardly being affected by noises in the transmission path. In contrast, the temporal variations in the transmission path response requires a large value for the coefficient $\alpha$.

The output from the coefficient calculation unit 160, namely the result from the applying of the inverse discrete Fourier transform by the IFFT circuit 166 is supplied to the delay time detector 170. As given above, the output from the coefficient calculation unit 160 indicating the impulse response of the delayed wave, for instance, a delay time td of the delayed wave can be obtained from its power peak. Delay time information detected by the detector 170 is supplied to the signal cut-out units 141 and 142.

Figure 3:
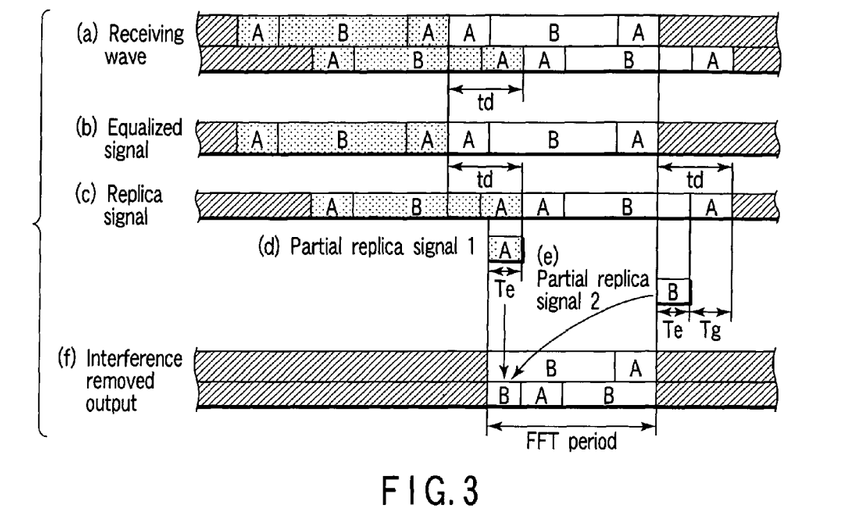
FIG. 3 is an exemplary view explaining an example of a signal flowing during operations of the removing circuit of the first embodiment.

In succession, referring to FIG. 3, the operations of FIG. 1 will be described. FIG. 3 is the exemplary view explaining the example of the signal flowing during the operations of the interference removing circuit 100 shown in FIG. 1. FIG. 3 shows two successive transmission symbols in close-up.

Firstly, the receiving wave (a) to which the delay wave of delay time td (td>Tg) is added to the desired wave is received to be input to the interference removing circuit 100. The input receiving wave (a) is input to the symbol position detector 150, the waveform equalizing unit 120 and the combining unit 140.

The symbol position detector 150 detects the breaks of the symbol of the desired wave to supply the position information to the signal cut-out units 141 and 142. As for a detection method for the breaks of the symbol, for instance, utilizing the high correlativity of a part corresponding to the signal parts of the guard interval and the rear part of the effective symbol of the desired wave is a possible approach.

The equalizing unit 120 equalizes the waveform of the receiving wave (a) on the basis of the filter coefficient supplied from the coefficient calculation unit 160 to supply an equalized signal (b) to the reflected wave component generation unit 130. The filter coefficient supplied from the calculation unit 160 being equal to the frequency response "H(ω)" of the delayed wave, giving filter coefficient to the FIR filter 131 and inputting the equalized signal (b) to the FIR filter 131 produces the replica signal of the reflected wave. The generation unit 130 supplies a replica signal (c) obtained in such manner to the combining unit 140.

In the combining unit 140, the receiving wave (a) is input to the delay circuit 143. The replica signal (c) is input to the cut-out units 141 and 142. The cut-out unit 141 cuts out the period of width Te [partial replica signal 1 (d)] of the part that is the rear end of the transmission symbol preceding the noticed symbol to supply it to the delay circuit 144. Here, the width Te denotes the width of the period in which the receiving wave (a) has been affected by the ISI. As shown in FIG. 3, setting the rear part of the transmission symbol to the FFT period, the width Te can be obtained in an equation: Te=td−Tg. The cut-out unit 142 cuts out the width Te [partial replica signal 2 (e)] of which the rear end is apart from the rear end of the symbol away by Tg from the rear end of the noticed transmission symbol to supply it to the delay circuit 145. The partial replica signal 1 (d) obtained in such manner is the replica equivalent to the signal component (f) derived from the preceding transmission symbol described in FIG. 10. The partial replica signal 2 (e) is the replica equivalent to the part in which the continuity of the delay wave component described in FIG. 10 has been missed therefrom. Thereby, the combining the receiving wave (a) and these partial replica signals enables removing the ISI and ICI during the FFT period.

The delay circuits 143, 144 and 145 delay the respective input signals by prescribed time periods to conform the delay of the signals, the subtracter 146 subtracts the partial replica signal 1 (d) from the part that is the head of the FFT period of the noticed transmission symbol of the receiving wave (a), and further, the adder 147 adds the partial replica signal 2 (e) to the part that is the head of the FFT period of the noticed transmission symbol. Then, the combining unit 140 outputs the interference removed output (f) in which the ICI component and the ISI component during the FFT period have been removed from the receiving wave (a) (FFT period is shown in close-up in FIG. 3) is obtained. And the interference removed output (f) is supplied as the output from the FFT circuit 161 and the interference removing circuit 100 to the FFT circuit 21 shown in FIG. 2.

That is to say, the combining unit 140 operates to combine a part of the replica signal (c) of the reflected wave in order to remove the ISI and the ICI from the period subjected to the ISI in the receiving wave (a) and to output the receiving wave (a) as it is during a period in which any combination is not performed. According to such operations, even when an estimation error is made in estimation of a transmission path response due to temporal variations in the noise and the transmission path response to generate an error in the replica signal (c) of the reflected wave, the affection is restrained in the period with the combination applied therein. So that a new interference is not generated in the period with any combination not performed therein, although the interference is not perfectly removed in the period with the combination applied therein because of errors, but the interference component is reduced, and then, the reception performance is improved as a whole.

Operating to reduce the interference while maintaining the transmission path response of the receiving wave (a), the interference removing circuit 100 has advantages such that it can calculate reliability of the demodulation result from a transmission path characteristic appeared in a frequency region after performing FFT and it can apply the conventional technique, as it is, to improve the reception characteristic owing to calculating the reliability.

In the aforementioned example, having described the delayed wave as one wave, the case in which the receiver is subjected to the ISI caused by a plurality of delayed waves goes the same. In the case of existence of the plurality of delay waves, the period of the width Te may be determined on the basis of the delay wave with a maximum delay time.

The period for the combination is not limited to the width Te described above.

Paying attention to the relationship between the replica signal (c) and the interference removing output (f) in FIG. 3 produces easy estimation that a similar effect can be obtained even when the removing circuit 100 cuts out the partial replica 1 (d) and the partial replica signal 2 (e) with a margin by the width Tg at a maximum at a rear and a front of the transmission symbol for the width Te mentioned above. As an example, the case in which the width Te is cut out wider by the width Tg at the rear and the front of the transmission symbol will be mentioned by referring to FIG. 4.

Figure 4:
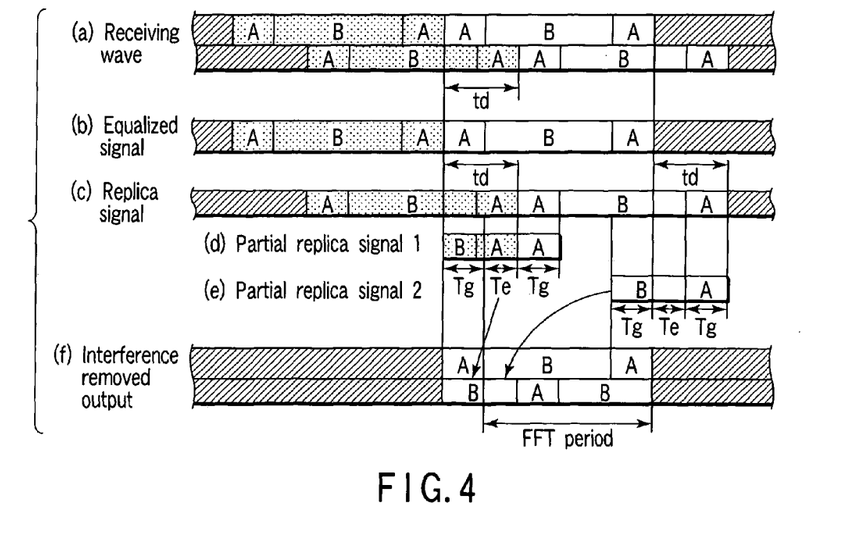
FIG. 4 is another exemplary view explaining an example of a signal flowing during operations of the removing circuit of the first embodiment.

FIG. 4 including the same receiving wave (a), equalized signal (b) and replica signal (c) as those in FIG. 3, the explanation about them will be omitted. The partial replica signal 1 (d) in FIG. 4 indicates an aspect to cut out the period including the period of the width Te that is the rear end of the preceding transmission symbol of the notable transmission symbol and expanding the width Te toward the rear and the front by the width Tg from the replica signal (c) of the reflected wave. The partial replica signal 2 (e) in FIG. 4 indicates an aspect to cut out the period including the period of the width Te having the part away from the rear end of the notable transmission symbol by the width Tg as a rear end and expanding the width Te toward the rear and the forward by the width Tg from the replica signal (c) of the reflected wave. As cleared by FIG. 4, since the partial replica signal 1 (d) cut out like this and the part indicated by a cord A corresponding to the rear part of the partial replica signal 2 (e) are composed of the same signal components, they are cancelled with each other in combining. Therefore, combining such signal to the receiving wave (a), the removing circuit 100 can remove the ICI and the ISI from the FFT period as show by the interference removed output (f). Extending the period for combining up to the end of the transmission symbol produces a possibility to set any part in the transmission symbol as the FFT period and also produces an advantage over obtaining the effect of the present invention. Furthermore, not shown in FIG. 3 by omitting, the front end and the read end of the transmission symbol in the interference removing output (f) become to have identical characteristics, so that S/N improvement effect can be expected by the way to include the signal, in which the period of the width Tg of the front end and the period of the width Tg of the rear end are averaged, to the FFT period.

Moreover, extending backward the period for combining is a possible design; the first embodiment has an advantage over increasing the degree of freedom in design. For instance, if it is acceptable that the delay time of the corresponding delayed wave is not longer than 2×Tg, the removing circuit 100 may generate to combine the partial replica signal 1 (d) and the partial replica signal 2 (e) corresponding to the period of width Tg from the head of the FFT. So that, the removing circuit 100 can be designed to make the width of the period to cut out constant. In this case, not becoming necessary to detect the delay time td, the removing circuit 100 has an advantage of eliminating the delay time detection circuit 170.

The present invention is not limited to the aforementioned first embodiment. A variety of types of modifications based on the first embodiment in accordance with the sprit of the invention can be easily designed, and such case also provides the same effect certainly. The replica generation unit 110 is, for example, not always needed to be configured by diving into a wave equalizing unit 120 and the reflected wave component generation unit 130, the FIR filter 121 and FIR filter 131 having been described as different constituent elements so as to facilitate to understand in the first embodiment, the generation unit 110 may combine the two FIR filters 121 and 131 into one FIR filter by utilizing the fact that the two FIR filters receive the same signal and may have the same characteristic. If a like operation is expected to be achieved, it is an easy approach for the combining unit 140 to be configured in such a circuit, for instance, not to perform combining after cutting out the replica signal in advance but appropriately select to output the combination result in which the receiving signal and the replica signal have already being combined over the whole period. The estimation method for the transmission path described in this embodiment is one example and other estimation method is available. Further, having described the embodiment by use of the feedback-type wave equalizing unit, the present invention is also carried out by using a feedfoward-type one. The use of the feedfoward-type one produces the possibility of application of the present invention also to the case for removing the ISI caused by the reflected wave reaches earlier than the desired wave.

The estimation method described in the embodiment is just one example, and undoubtedly, the other estimation method for the transmission path is useful. An algorithm to directly calculate a property of an adaptive filter, as expressed in equation (2), is called a direct analysis-type algorithm for a successive correction-type algorithm such as a least square error method. Not described here, the removing circuit 100 can define the error by means of the waveform equalizing unit 120 to employ the successive correction-type algorithm such as a least square error method. It is just a design matter to determine the type of the algorithm for adoption in implementing the present invention; however, it is no wonder that the direct analysis-type algorithm generally has an advantage of achieving high-speed follow-up to variations in the transmission path response more easily than the successive correction-type algorithm.

Moreover, the first embodiment can take a variety of variations also in the generation method and the combining method for the replica signal. And even such methods can certainly extract effective results from the present invention.

Second Embodiment

Figure 5:
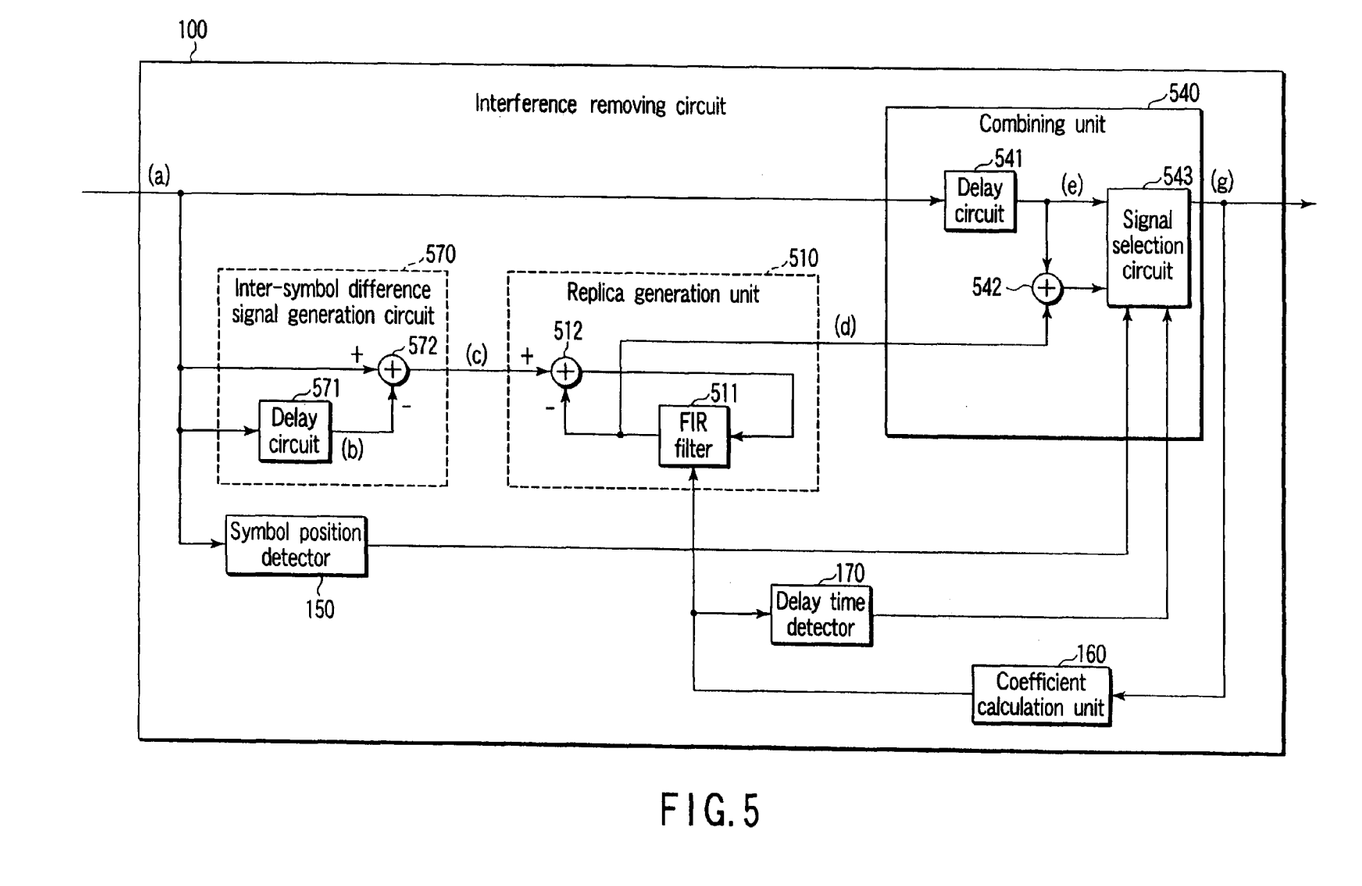
FIG. 5 is an exemplary block diagram showing an example of a configuration of an interference removing circuit of a second embodiment that is an example of the present invention.
Figure 6:
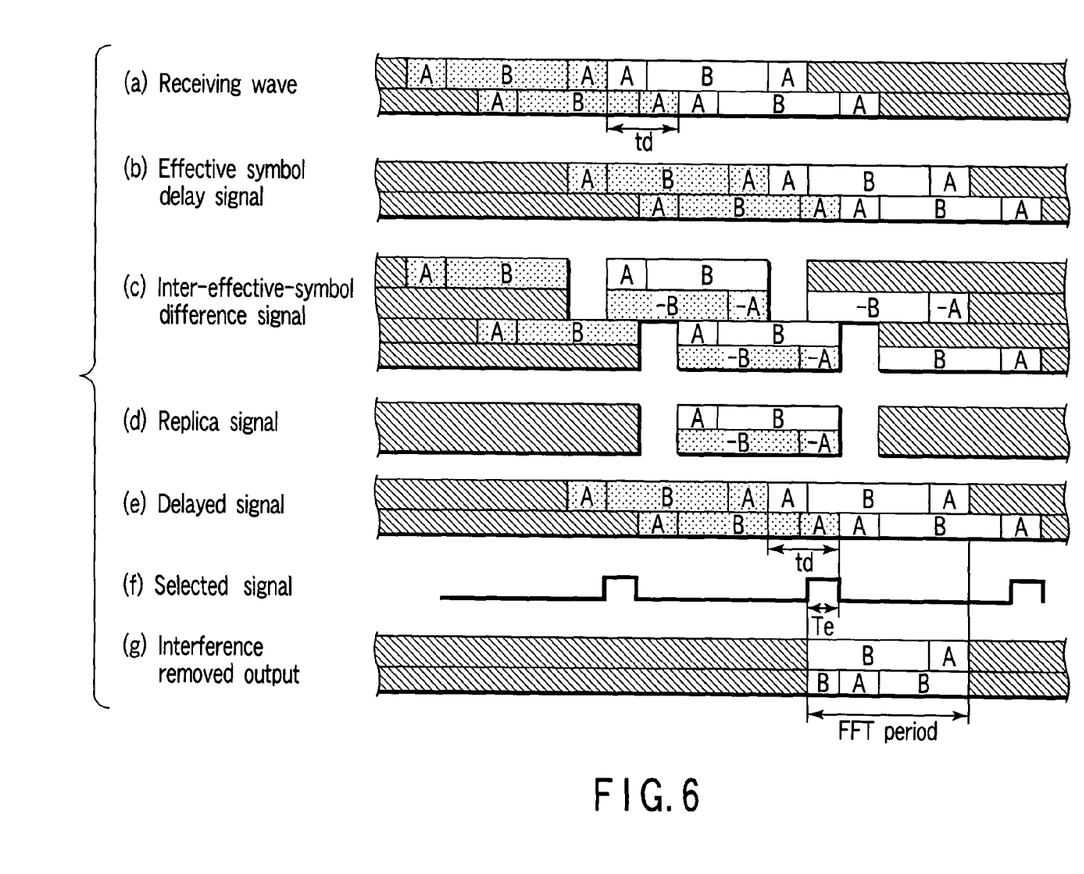
FIG. 6 is an exemplary view explaining an example of a signal flowing during operations of the removing circuit of the second embodiment.

Referring next to FIG. 5 and FIG. 6, a second embodiment will be set forth.

In particular, another embodiment in which a generation method and a combining method for a replica signal have been changed will be explained. The second embodiment is featured by firstly obtaining the difference between a signal resulting from delaying the receiving wave by the effective symbol period and the receiving wave, then, generates the replica signal on the basis of the difference signal. The case in which the interference removing circuit of the second embodiment appropriately selects the result of combination of the receiving wave and the replica signal over the whole period and the receiving wave to output it is also exemplified.

FIG. 5 is the block diagram showing the configuration of the interference removing circuit in the second embodiment. The removing circuit is applied to the receiver for the digital modulated signal 20.

The removing circuit 100 comprises the symbol position detector 150 detecting breaks in the transmission symbol from the input signal, a inter-symbol difference signal generation circuit 570 outputting the difference between the input signal and the signal resulting from delaying the input signal by the effective symbol period (inter-symbol difference signal), a replica generation unit 510 generating the replica signal of the reflected wave from the inter-symbol difference signal, a combining unit 540 combining the replica signal of the reflected wave and the input signal, the coefficient calculation unit 160 estimating a transmission path response from the output of the combining unit 540 to control a characteristic of the replica generation unit 510 and the delay time detection unit 170 detecting a delay time of a delay wave from the output of the calculation unit 160.

The difference signal generation circuit 570 consists of a delay circuit 571 delaying the input signal by the effective symbol period and a subtracter 572 subtracting the delay signal from the input signal.

The replica generation unit 510 is composed of an FIR filter 511 to which the output from a subtracter 512 is connected and of which the coefficient is varied by the calculation unit 160 and the subtracter 512 subtracting the output of the FIR filter 511 from the input signal.

The combining unit 540 is composed of a delay circuit 541 delaying the input signal by a prescribed time, an adder 542 adding a signal supplied from the replica generation unit 510 to the output from the delay circuit 541 and a signal selection circuit 543 selectively outputs the output from the delay circuit 541 and the output from the adder 542, based on the detection result of the symbol position detector 150 and the delay time detector 170.

Because the symbol position detector 150, coefficient calculation unit 160 and delay time detector 170 may each have the same configuration and operation as the constituent elements attached the same cords shown in FIG. 1, individual explanations for them will be omitted.

Successively, the operations of the removing circuit 100 in FIG. 5 regarding the second embodiment will be described with reference to FIG. 6. FIG. 6 shows the exemplary view explaining one example of the signal flowing during the operations of the removing circuit 100 shown in FIG. 5. FIG. 6 shows sequencing two transmission symbols in close-up.

Firstly, the receiving wave (a) in which the delay wave of delay time td (td>Tg) is added to the desired wave is received to input to the interference removing circuit 100. The input receiving wave (a) is input to the symbol position detector 150, the inter-symbol difference signal generation circuit 570 and the combining unit 540.

The symbol position detector 150 detects the breaks of the desired symbol from the input receiving wave (a) to supply its position information to the signal selection circuit 543.

The signal generation circuit 570 delays the receiving wave (a) by the time period equivalent to the effective symbol period (period removing the guard interval from the transmission symbol) [(effective symbol delay signal (b)] by means of the delay circuit 571. Then, subtracts the effective symbol delay signal (b) from the input signal through the subtracter 572, and supplies an inter-effective-symbol signal (c) to the replica generation unit 510. As known from FIG. 6, the guard interval period of the desired wave included in the effective symbol delay signal (b) temporarily coincides with the rear section of the effective symbol having the same signal component as the guard interval of the receiving wave (a), so that the signal components are removed. The delay wave goes the same. In showing in a figure, signal components which have cancelled with each other like the inter-effective-symbol difference signal (c) is expressed so as to leave a gap.

The replica generation unit 510 is an example expressing the replica generation unit 110, described in the first embodiment, by a signal FIR filter and can generate a replica signal (d) of the difference signal from the difference signal (c) to supply it to the combining unit 540 by providing a filter efficient supplied from the calculation unit 160 to the FIR filter 511. The replica signal (d) of the difference signal is taken out as an output from the FIR filter 511. The generated replica signal (d) of the difference signal is a signal equivalent to a delayed wave component included in the difference signal (c).

In the combining unit 540, the receiving wave (a) is input to the delay circuit 541. The delay circuit 541 delays the receiving wave (a) by the time corresponding to the effective symbol period [delayed signal (e)]. The adder 542 adds a delayed signal (e) to the replica signal (d) of the difference signal to supply the addition result to the signal selection circuit 543. The selection circuit 543 operates so as to selectively output a signal from the adder 542 on the basis of the symbol position information and delay time information during the period of the width Te from the front end of the FFT period and also output the signal from the delay circuit 541 during the period other than the period of the width Te. The aspect of the selection can be represented like a selection signal (f). Here, the width Te is defined as a width of a period in which the receiving wave (a) is subjected to the ISI. As shown in FIG. 6, when the rear section of the transmission symbol is defined as the FFT period, the width Te is obtained in an equation: Te=td−Tg.

In other words, the combining unit 540 outputs a result from combing the replica signal (d) of the difference signal in order to remove the ISI and ICI from the receiving wave (a) for the period in which the receiving wave (a) has being subjected to the ISI and operates in order to output the receiving wave (a) as it is for a period other than the above-described period. Even if the foregoing operation occurs an estimation error in estimation of the transmission path response due to temporal variations in noise and the transmission path response and occurs an error in the replica signal (d) of the difference signal, because influence is limited in a period in which the combination has been performed, a new interference is not generated in a period in which the combination has not been performed. And although the interference cannot be removed completely because of the error in the period in which the combination has been performed, owing to the reduction in the interference component, reception performance is improved. The period outputting the combination result is not limited to the above-mentioned width Te, and it is needless to say that outputting of the combination result while having a margin by the width Tg at a maximum rear and front sections like the description for the first embodiment produces the same effect.

A variety of modifications are easily designed in the second embodiment, and such modifications each have the same effects certainly. For instance, having described that the delay circuit 571 and delay circuit 541 as individual constituent elements for easy understanding, the delay circuits 571 and 541 may be configured in a signal delay circuit by aiming that identical signals are input to the two delay circuits 571 and 541 and may each have identical delay times.

Third Embodiment

In succession, a third embodiment will be described by referring to FIG. 7 and FIG. 8.

Other embodiment varying the generation method and combining method for the replica signal will be described. The third embodiment is featured by setting a signal cut-out unit in front of a reflected wave component generation unit. Such a configuration enables the delay time detection circuit to be omitted.

Figure 7:
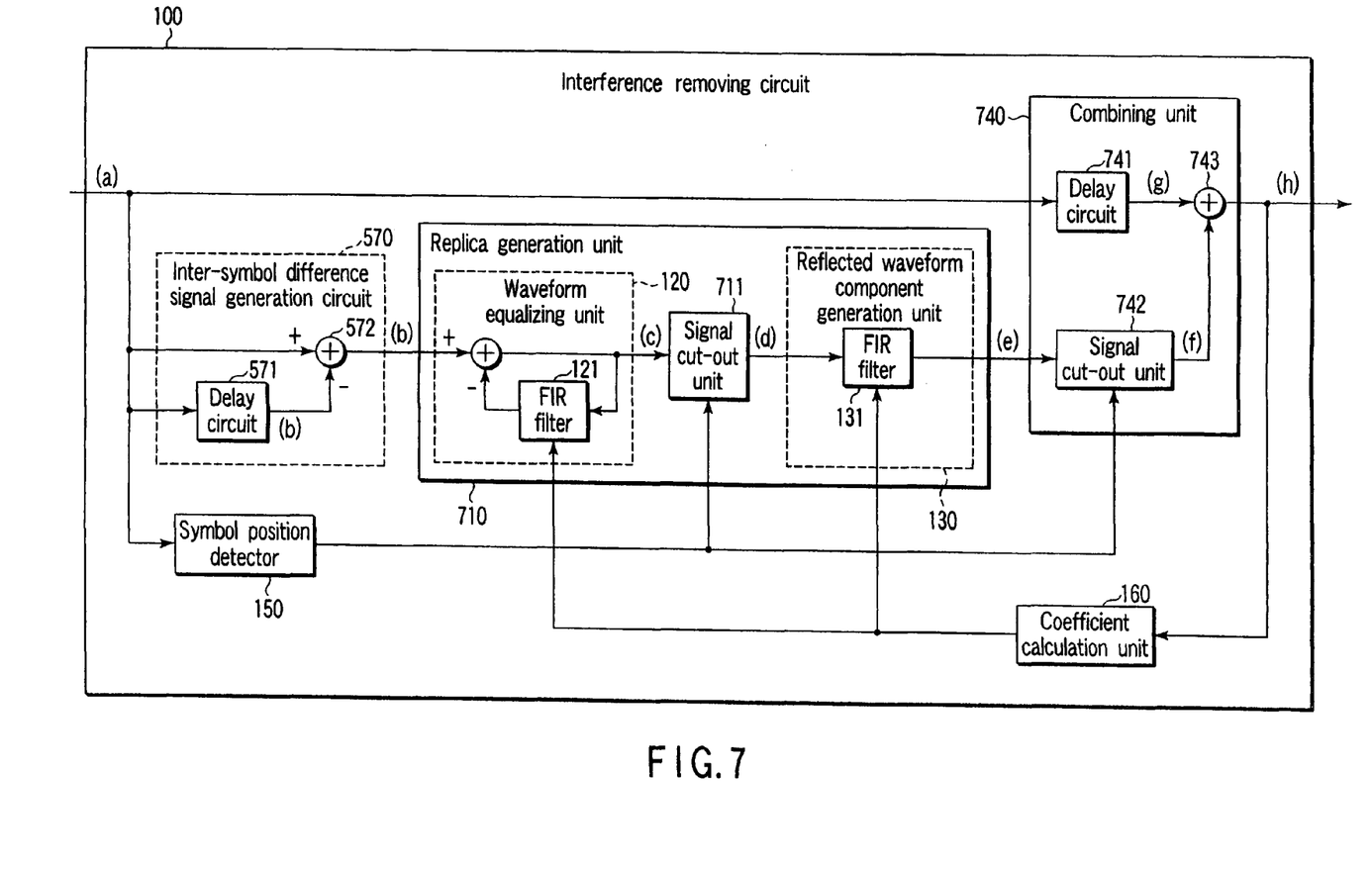
FIG. 7 is an exemplary block diagram showing an example of a configuration of an interference removing circuit of a third embodiment that is an embodiment of the present invention.

FIG. 7 is the block diagram showing the configuration of the interference removing circuit 100 in the third embodiment. The removing circuit 100 is applied to the receiver for the digital modulated signal 20 shown in FIG. 2.

The removing circuit 100 comprises the symbol position detector 150 detecting the breaks of the transmission symbol from the input signal, an inter-symbol difference generation circuit 570 outputting the difference (inter-symbol difference signal) between the input signal and a signal resulting from delaying the input signal by the time of the effective symbol period, a replica generation unit 710 generating a partial replica signal of a reflected wave from the inter-symbol difference signal, a combining unit 740 combining the partial replica signal of the reflected wave with the input signal and the coefficient calculation unit 160 estimating the transmission path response from the output of the combining unit 740 to control the property of the replica generation unit 710.

The replica generation unit 710 is composed of the waveform equalizing unit 120 waveform-equalizing the input inter-symbol difference signal, a signal cut-out unit 711 cutting out a part of the output signal from the equalizing unit 120 and the reflected wave component generation unit 130 generating to output a partial replica signal of the reflected wave from the output of the cut-out unit 711.

A delay circuit 741 delaying the input signal to a predetermined time, a signal cut-out unit 742 cutting out a part of the partial replica signal of the reflected wave on the basis of the detection result from the detector 150, and an adder 743 adding to out the output from the delay circuit 741 and the signal cut-out unit 742 constitute the combining unit 740.

Because the symbol position detector 150, inter-symbol difference signal generation circuit 570, waveform equalizing unit 120, reflected wave component generation unit 130 and coefficient calculation unit 160 may each have the same configuration and operation as the constituent elements with the identical codes shown in FIG. 1 of the first embodiment or shown in FIG. 5 of the second embodiment attached thereto, detailed explanation will be omitted.

Figure 8:
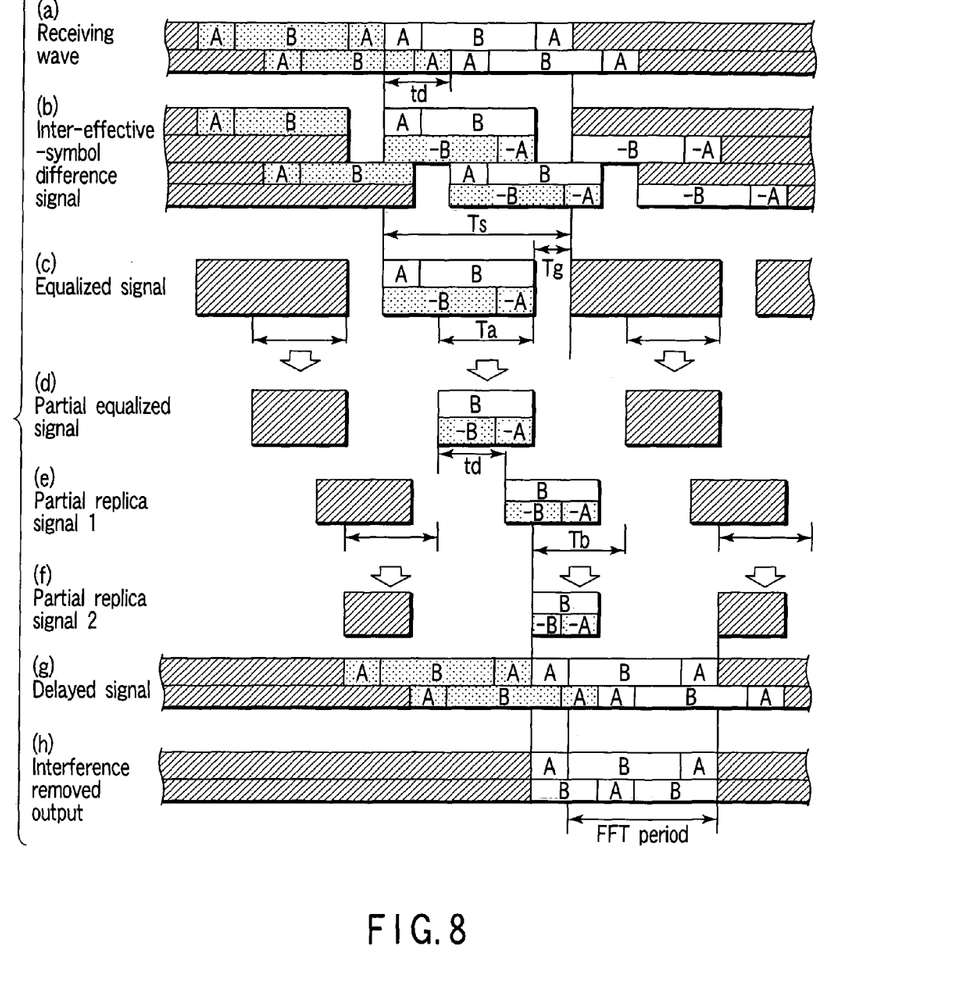
FIG. 8 is an exemplary view explaining an example of a signal flowing during operations of the removing circuit of the third embodiment.

Next to this, operations of FIG. 7 will be set forth by use of FIG. 8. FIG. 8 is the view explaining one example of the signal flowing in operating the interference removing circuit 100 shown in FIG. 7. FIG. 8 shows consecutive two transmission symbols in close-up.

At first, the receiving wave (a) in which the delay wave having the delay time td (td>Tg) is added to the desired wave is received and input to the interference removing circuit 100. The input receiving wave (a) is input to the symbol position detector 150, combining unit 570, and combining unit 740.

The position detector 150 detects the breaks of the desired wave from the input receiving wave (a) to supply the position information to the signal cut-out unit 711 and the signal cut-out unit 742.

The inter-symbol signal generation circuit 570 generates the effective inter-symbol difference signal (b) from the receiving wave (a) to supply it to the replica generation unit 710.

The difference signal (b) supplied to the generation unit 710 is input to the waveform equalizing unit 120, and the equalizing unit 120 waveform-equalizes the difference signal (b) on the basis of the filter coefficient supplied from the coefficient calculation unit 160 to supply the equalized signal (c) to the cut-out unit 711.

The cut-out unit 711 supplies the signal [partial equalized signal (d)] which has been cut out the period of the width Ta from the equalized signal (c) on the basis of the position information of the transmission symbol to the reflected wave component generation unit 130. It is appropriate for the period of the width Ta to be, for instance, a width of Ts/2 by setting a part away from the rear end of the notable transmission symbol by Tg as rear end. In this case, the cut-out unit 711 can produce an effective result to the reflected wave having the delay time not longer than Ts/2.

The reflected wave component generation unit 130 generates a partial replica signal 1 (e) from the partial equalized signal (d) to supply it to the combining unit 740 by putting the filter coefficient supplied from the coefficient calculation unit 160 to the FIR filter 131.

In the combining unit 740, the receiving wave (a) is input to the delay circuit 741, and the delay circuit 741 supplies a signal [delayed signal (g)] resulting from delaying the receiving wave (a) by the time equal to the effective symbol period to the adder 743. The partial replica signal 1 (e) is input to the cut-out unit 742, and the cut-out unit 742 supplies a signal [partial replica signal 2(f)] by which a period of a width Tb is cut out from the partial replica signal 1 (e) of the reflected wave on the basis of the position information of the transmission symbol. The period of the width Tb is suitable, for example, for a period equivalent to the period of the width Ts/2 from the head of the transmission symbol with the delayed signal (g) corresponded thereto.

The adder 743 adds the input delayed signal (g) to the partial replica signal 2 (f).

As a result, an interference removed output (h) in which the ICI component and the ISI component are removed from the receiving wave (a) is obtained as the output from the combining unit 740 to supply, as the output from the interference removing circuit 100, to the FFT circuit 21 shown in FIG. 2.

That is to say, the combining unit 740 operates so that it combines the partial replica signal 1 (e) in the period including a period in which the receiving wave (a) is subjected to the ISI, outputs the result of removing the ISI and ICI, and outputs the receiving wave (a) as it is in the period other than the period including the period. Even when an estimation error in the estimation of the transmission path response occurs owing to temporal variations in noise and the transmission path response and occurs an error in the partial replica signal 1 (e) of the difference signal, the affection being limited in the period in which the combination has been performed, a new interference does not occur in the period in which the combination has not been performed. Then, although the interference is not removed perfectly due to the error in the period in which the combination has been performed, the interference components are reduced, so that the reception performance is improved.

For the embodiment, a various modifications are easily designed, and even in such modifications, the same effects are certainly produced. For instance, having described that the delay circuit 571 and delay circuit 741 as individual constituent elements for easy understanding, the delay circuits 571 and 741 may be configured in a signal delay circuit by aiming that identical signals are input to the two delay circuits 571 and 741 and may each have identical delay times.

In the first, second and third embodiments, having described the case where each interference removing circuit receives the receiving wave with the delayed wave of the delay time td (td>Tg) added thereto so as to be described easily, the present invention is not limited to such a case in which the removing circuit receives a delayed wave of the length exceeding the guard interval length. For instance, it is easy to understand that when the center of the transmission symbol is determined as the FFT period, the FFT period receives the ISI resulted from the delay wave of the delay time td (td>Tg/2) and that the applying of the present invention has an effect on such ISI. The third embodiment is possible to operate so as to be effective against the reflected wave of the delay time td (Ts/2>td>0). Furthermore, as also described in the first embodiment, using the feedforward-type waveform equalizing unit by applying the present invention has an effect also on the case in which the ISI caused by a reflected wave having an arrival time faster than that of a desired wave is expected to remove. Moreover, not being needed to pay an attention to the guard interval length, it is easy to understand that even when receiving an OFDM modulated signal without having the guard interval, the present invention is applicable and effective.

The present invention is not limited to a receiver for receiving an OFDM modulated signal, and applicable to a receiver for receiving other type of a multi-carrier modulated signal. In view of the aforementioned embodiments, it is easily understood that the present invention can be applied to a receiver for digital modulated signal for converting a signal obtained by receiving the multi-carrier modulated signal from a time region into a frequency region by Fourier transform. In other words, it is suitable for combining the interference removed components generated from the receiving signal on the basis of the transmission path response of the receiving signal with the receiving signal only within a partial period including a period subjected to the ISI among periods to be applied Fourier transform before applying Fourier transform and for doing nothing in the period other than such partial period. Such processing is certainly implemented in software processing without using any dedicated hardware and possible to obtain an effect of the present invention similarly.

The present invention is exemplified in the following aspects.

(1) A receiver for a digital modulated signal, which receives a multi-carrier modulated signal and demodulates a receiving signal by converting it from a time region into a frequency region by Fourier transform, comprises a Fourier transformer which performs Fourier transform; and an interference removing circuit which is disposed in a front stage of the Fourier transformer and reduces the ISI or ICI of the receiving signal.

(2) The receiver described as in (1), wherein the interference moving circuit reduces the interference by applying signal processing to the receiving signal in the time region on the basis of a transmission path response estimated from the receiving signal.

(3) The receiver described as in either (1) or (2), wherein the interference removing circuit operates so as to reduce the interference while maintaining a transmission path response of the receiving signal.

(4) A receiver for digital modulated signal, which receives a multi-carrier modulated signal and demodulates a receiving signal by converting it from a time region into a frequency region by Fourier transform, comprises a Fourier transformer which performs Fourier transform; and an interference removing circuit which is disposed in a front stage of the Fourier transformer and reduces ISI or ICI of the receiving signal, wherein the circuit each combines interference removing components generated from the receiving signal with the receiving signal at every period for performing the Fourier transform on the basis of a transmission path response of the receiving signal only in an appropriate period including a period subjected the ISI or ICI and outputs the receiving signal as it is other than the appropriate period.

(5) The receiver described as in (4), wherein the removing circuit includes a replica generation unit which generates the interference removing component from the receiving signal; a combining unit which combines the interference removing component with the receiving signal; and a coefficient calculation unit which estimates the transmission path response from the receiving signal to control a characteristic of the replica generation unit.

(6) The receiver described as in (5), wherein the coefficient calculation unit estimates a transmission path response from an output signal of the interference removing circuit (7) The receiver described as in any one of (1)-(6), wherein the Fourier transformer performs Fourier transform by fast Fourier transform (FFT).

(8) The receiver described as in any one of (1)-(7), wherein the multi-carrier modulated signal is an orthogonal frequency division multiplexing (OFDM)-modulated signal.

(9) The receiver described as in any one of (6)-(8), wherein the transmission path response is estimated by using a direct analysis-type algorithm.

(10) A receiving method for a digital modulated signal, which receives a multi-carrier modulated signal and demodulates a receiving signal by converting it from a time region into a frequency region by Fourier transform, comprises reducing ISI or ICI on the receiving signal; and performing Fourier transform of the receiving signal reduced in the ISI or the ICI.

(11) The receiving method described as in (10), wherein the ISI or ICI of the receiving signal is reduced by applying time region processing to the receiving signal on the basis of transmission path response estimated from the receiving signal.

(12) The receiving method described as in either (10) or (11), wherein the ISI or ICI of the receiving signal is reduced while maintaining a transmission path response of the receiving signal.

(13) The receiving method described as in (10), further comprise generating an interference removing component from the receiving signal on the basis of a transmission path response of the receiving signal; combining the interference removing component with the receiving signal in an appropriate period including a period subjected to the ISI or the ICI of the receiving signal; and not combining in a period other than the appropriate period.

(14) The receiving method described as in (13), wherein the transmission path response is estimated from a signal after performing the interference removing.

(15) The receiving method described as in any one of (10) to (14), wherein the Fourier transform is performed by FFT.

(16) The receiving method described as in any one of (10) to (15), wherein the multi-carrier modulated signal is an OFDM-modulated signal.

(17) The receiving method described as in any one of (14) to (16), wherein the transmission path response is estimated by using a direct analysis-type algorithm.

According to the aforementioned (1), (2) or (10), (11), the ISI and ICI can be removed by removing interferences in the time region before performing Fourier transform and reception performance is improved. As a result, the receiver for the digital modulated signal or the receiving method for the same can be provided, respectively.

According to the aforementioned (3) or (12), the transmission path response of the receiving signal being maintained, the receiver or the receiving method has an advantage such that the conventional technology which can calculate the reliability of the demodulation result from a transmission property appeared in the frequency region after performing Fourier transform and improves the reception property is applicable as it is.

According to the foregoing (4) or (13), the transmission path response of the receiving signal being maintained, the receiver or the receiving method has an advantage that the conventional technology which can calculate the reliability of the demodulation result from a transmission property appeared in the frequency region after performing Fourier transform and improves the reception property are applicable as it is.

According to the above-described (9) or (17), the receiver or the receiving method has an advantage that it follows to variations in transmission path response at a high speed easier than a successive correction-type algorithm, by using the direct analysis-type algorithm.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A receiver for a digital modulated signal, which receives a multi-carrier modulated signal and demodulates the received signal, comprising:
an interference removing circuit configured to remove an inter-symbol interference from a received signal comprising:
a replica generation unit configured to receive a digital complex baseband signal based on the received signal and to generate a replica signal including an interference removing component derived from a plurality of successive transmission symbols by processing the digital complex baseband signal in a time region on the basis of a transmission path response estimated from the digital complex baseband signal; and
a combining unit configured to combine the interference removing component included in the replica signal with the digital complex baseband signal in order to remove a signal component derived from adjacent transmission symbols while the received signal has been affected by an inter-symbol interference and output a combined signal, and to output the digital complex baseband signal during a period in which combination is not performed;
a Fourier transformer configured to transform a signal supplied from the combining unit from a time region into a frequency region by Fourier transform; and
a demodulation circuit configured to demodulate a transformed signal supplied from the Fourier transformer.

2. The receiver according to claim 1, wherein the interference removing circuit operates so as to reduce the interference while maintaining a transmission path response of the digital complex baseband signal.

3. A receiving method for a digital modulated signal, which receives a multi-carrier modulated signal and demodulates the received signal, comprising:
receiving a digital complex baseband signal based on the received signal;
generating a replica signal including an interference removing component derived from a plurality of successive transmission symbols by processing the digital complex baseband signal in a time region on the basis of a transmission path response estimated from the digital complex baseband signal; and
combining the interference removing component included in the replica signal with the digital complex baseband signal in order to remove a signal component derived from adjacent transmission symbols while the received signal has been affected by an inter-symbol interference, and outputting a combined signal, and outputting the digital complex baseband signal during a period in which the combining is not performed;
transforming the combined signal and the digital complex baseband signal from a time region into a frequency region by Fourier transform; and
demodulating the transformed signal.

4. The receiving method according to claim 3, wherein an inter-symbol interference of the digital complex baseband signal is reduced by applying time region processing to the digital complex baseband signal on the basis of transmission path response estimated from the digital complex baseband signal.

5. The receiving method according to claim 4, wherein the inter-symbol interference of the digital complex baseband signal is reduced while maintaining a transmission path response of the digital complex baseband signal.

6. The receiving method according to claim 3, further comprising:
generating the replica signal from the digital complex baseband signal on the basis of a transmission path response of the digital complex baseband signal; and
not combining in a period other than the appropriate period.

7. The receiving method according to claim 6, wherein the transmission path response is estimated from a signal after removing the interference.

8. The receiving method according to claim 3, wherein the Fourier transform is performed by FFT.

9. The receiving method according to claim 3, wherein the multi-carrier modulated signal is an OFDM modulated signal.

10. The receiving method according to claim 4, wherein the transmission path response is estimated by using a direct analysis-type algorithm.

11. A receiver for digital modulated signal, which receives a multi-carrier modulated signal and demodulates the received signal, comprising:
an interference removing circuit configured to remove an inter-carrier interference and an inter-symbol interference from a received signal;
a transmission path response estimate unit configured to estimate a transmission path response from the received signal;
a Fourier transformer configured to transform a signal supplied from the interference removing circuit from a time region into a frequency region by Fourier transform; and
a demodulation circuit configured to demodulate a transformed signal supplied from the Fourier transformer,
wherein the interference removing circuit comprising;
a replica generation unit configured to generate a replica signal including an interference removing component for an inter-carrier interference and an inter-symbol interference; and
a combining unit configured to combine the replica signal supplied from the replica generation unit with the received signal,
wherein the replica generation unit configured to receive a digital complex baseband signal based on the received signal and to generate a replica signal derived from a plurality of successive transmission symbols by processing the digital complex baseband signal in a time region on the basis of a transmission path response estimated from the digital complex baseband signal; and
the combining unit configured to combine the interference removing component included in the replica signal with the digital complex baseband signal while the received signal has been affected by an inter-symbol interference and an inter-carrier interference and output a combined signal, to compensate a part of lacked continuity of a delayed wave component, and to remove a signal component derived from adjacent transmission symbols, wherein the combining unit outputs the digital complex baseband signal during a period in which combination is not performed.

12. The receiver according to claim 11, wherein the replica generation unit acquires a difference signal between the received signal and a signal with which the received signal is delayed by an effective symbol period, and generates replica signal from the difference signal.

13. The receiver according to claim 11, wherein the replica generation unit comprises feedfoward-type wave equalizing unit, and removes inter-carrier interference and inter-symbol interference components derived from a reflected wave which reaches earlier than the desired wave.

14. The receiver according to claim 11, wherein the combining unit combines the replica signal with the digital complex baseband signal to the end of the transmission symbols exceeding a Fourier transform period.

15. The receiver according to claim 11, further comprising a signal which averaged a period between Tg (wherein Tg is a guard interval) of the front end and Tg of a back end, of the transmission symbols is included in a Fourier transform period.

16. The receiver according to claim 11, wherein the interference elimination circuit removes the interferences, with the transmission path response of the received signal maintained, and the transmission path response estimate unit estimates the transmission path response from an output signal of the interference removing circuit.

17. The receiver according to claim 11, wherein the interference elimination circuit removes the interferences, with the transmission path response of the received signal maintained, and calculates a reliability of a demodulated signal based on an output from the Fourier transformer, and improves a receiving characteristic.

* * * * *